Nov. 27, 1951 R. D. PIKE 2,576,141
BEARING
Filed Dec. 6, 1944

INVENTOR.
ROBERT D. PIKE.
BY
Fay, Gobrick, Chitton & Isler.
Attorneys.

Patented Nov. 27, 1951

2,576,141

UNITED STATES PATENT OFFICE 2,576,141

BEARING

Robert D. Pike, Pittsburgh, Pa.

Application December 6, 1944, Serial No. 566,818

11 Claims. (Cl. 308—26)

The present invention relates to a sleeve bearing. This bearing is adapted for use in heavy duty internal combustion engines, particularly for the main crankshaft bearing in aircraft engines of the air cooled radial type, but it may be employed wherever heavy duty sleeve bearings used.

An object of the invention is to provide a cellular structure within the metal wall of a bearing, so designed as to provide an appreciable elastic yield under pounding to which bearings are subjected to in internal combustion engines. This elastic yield is often sufficient to prevent seizure and breakdown of the bearings when the working pressure exerted on the bearing is in the order of magnitude of the pressure of rupture of the oil film. By use of my bearing, therefore, higher pressures of operation may be employed than is now permissible without damage to the bearing.

A further object of my invention is to provide a cellular structure within the wall of the bearing adjacent the bearing surface through which structure oil may be circulated for efficient cooling the bearing or for other purposes. Thus, the rate of flow of oil in close heat transfer relation with the bearing surface is substantially increased over that of the usual type of bearings. The cooling oil circulated through the cellular wall structure is separated from the actual bearing surface by as little as .030 inch of copper and .005 inch of bearing metal so that a substantial amount of heat may be extracted from the bearing by this oil.

Other objects and advantages of my invention will be apparent from the following description and preferred form of embodiments of the invention, reference being made to the accompanying drawings wherein.

Certain figures show bearing wall structures that are similar to one another and the similar elements are designated by the same numerals but preceded by a distinguishing digit.

Figure 1:
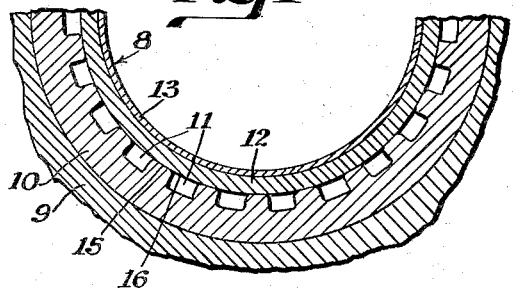
Fig. 1 is a fragmentary, cross-sectional view of a sleeve bearing in its support.

It is to be understood that the proportions of the various elements in the drawings are not necessarily correct, certain thicknesses of metal, for example, being shown exaggerated for indicating its presence.

Referring to Fig. 1 of the drawings, a portion of a sleeve bearing 8 is shown in a bearing support 9, which bearing is comprised of a cylindrical steel back 10 having straight, parallel longitudinally extending grooves or channels 11 formed therein, a plating of copper 12 covering the inner surface of the steel back and bridging the channels 11, and a layer of bearing metal 13.

In fabricating the bearing, I cut the channels 11 in the steel back 10, as by milling, for example, and, preferably, the channels are open at the ends. These channels may be circumferential or spiral instead of longitudinal, or they may be cut in any combination of these forms. The depth of the channels are preferably, from .010 to .030 inch deep, and approximately .050 inch wide. The space between the channels may be .020 to .040 inch.

After the channels 11 have been cut, they are filled with an electrically conductive material having a relatively low melting point, such as wax, and the copper 12 is then electrodeposited on the wax surface and is integrally bonded with the exposed surface of the steel back 10. The copper deposited is of sufficient thickness to allow finishing to approximately .030 inch. I choose copper rather than silver as the metal to electrodeposit because its physical properties are more desirable. Like silver, copper is highly conductive of heat, but unlike silver, it has far higher elastic properties, suffering permanent deformation under a stress about seven times greater than for silver. In order to carry out the functions of my bearing, the heat conductivity and the elastic properties of copper are preferable.

After the copper has been deposited and finished to dimension, I heat the bearing for melting the wax so that it can be removed from the channels, thus leaving voids that are spanned by copper. Thus, a cellular wall structure is formed. After the wax has been removed, the bearing metal 13, which may be high tin babbitt, electrodeposited lead, or an electrodeposited alloy of silver and lead, or any suitable type of bearing metal is applied on the copper. This metal is preferably electrodeposited and its depth may be .005 inch or less.

The cellular wall structure of my bearing is in effect a series of copper beams 16 supported at their ends on steel abutments 15 and having a span of approximately .05 inch. The thickness of the beams is approximately .030 inch. When the load on the bearing is 10,000 p. s. i. of projected area, the fiber stress of the copper beams will be at about the elastic limit of the beam, and the deflection will be about ten millionths of an inch. It will be noted that the supports for the beams are relatively rigid.

Figure 2:
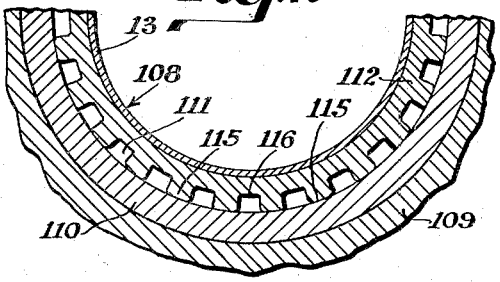
Fig. 2 is a view similar to that of Fig. 1, but of another form of bearing.

In Fig. 2, there is shown a bearing wall structure 108 in which the abutments 115 for the beams 116 are of copper. This wall structure is formed by depositing on the smooth surface of the steel back 110 from .010 to .030 inch of copper integrally bonded, and then cutting grooves 111 in the copper. The grooves are then filled with wax similar to that described above and the electrodeposition of the copper is continued until the thickness of the copper over the wax is such to allow finishing to .030 inch. The wax is then removed and the bearing metal applied in the manner described hereinbefore. Thus, the copper beams are supported on copper abutments.

Another method of forming a bearing wall having a structure similar to that shown in Fig. 2 is to coat the steel back with a coating of the wax the depth desired for the depth of the channels 111, then remove the wax from the steel back surface where it is desired to have the abutments as by cutting the wax, then depositing copper over the remaining wax, which wax will be in the form of ridges, and the steel back to a depth to permit finishing the copper to a depth of .05 inch. The wax may then be melted and removed from the bearing. By this method, no milling operations are required for the channels.

Figure 3:
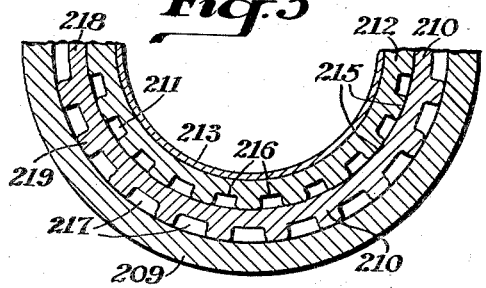
Fig. 3 is a view similar to that of Fig. 1, but of still another form of bearing.

Referring to Fig. 3, another form of bearing is shown having a still more resilient bearing wall. In this embodiment of the invention, the steel back 210, which is approximately .050 inch thick, has a copper structure on the smooth surface thereof comprising copper beams 216 supported on copper abutments 215 and a bearing metal 213 on the copper. This structure is formed as described with reference to the bearing structure shown in Fig. 2. Grooves or channels 217 are cut in the outer surface of the steel back so that the channels lie beneath each abutment 215, i. e., they are offset circumferentially with respect to the channels 211. It will be seen that by cutting the grooves 217 beams 218 are formed which in turn support the abutments 215. The beams 218 and their abutments 219 are of steel and the abutments rest on the bearing support 209. The grooves 217 are approximately .030 inch deep and .050 inch wide thereby forming supporting beams approximately .050 inch long and .020 inch thick. By forming two tiers of openings or cells in the bearing structure, an exceedingly resilient bearing wall is provided.

Figure 4:
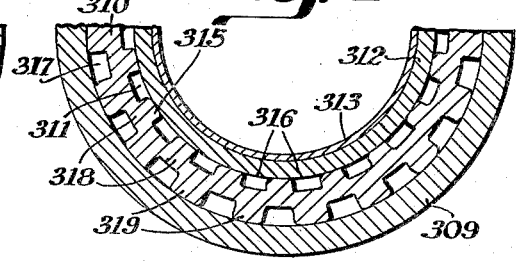
Fig. 4 is a view similar to that of Fig. 1, but of a fourth form of bearing.

A bearing having still another cellular wall structure is shown in Fig. 4 in which the abutments 315 for the copper beams 316 are of steel and these abutments are supported on steel beams 318 which in turn are supported on steel abutments 319 resting on the bearing support 309. In making this form, the same procedure is followed as described in the making of the bearing shown in Fig. 1, but in addition grooves 317 are cut in the outer surface of the steel back 310 for forming the beams 318.

It is apparent that relative resilient wall structures are provided by my invention. Also, oil may be circulated through the channels or voids in the wall structure for removing heat from the bearing surface, as these channels are close to the bearing surface, or for other purposes.

Figure 6:
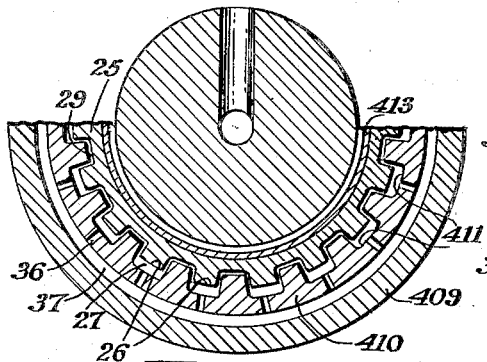
Fig. 6 is a view taken on the line 6—6 of Fig. 5.
Figure 5:
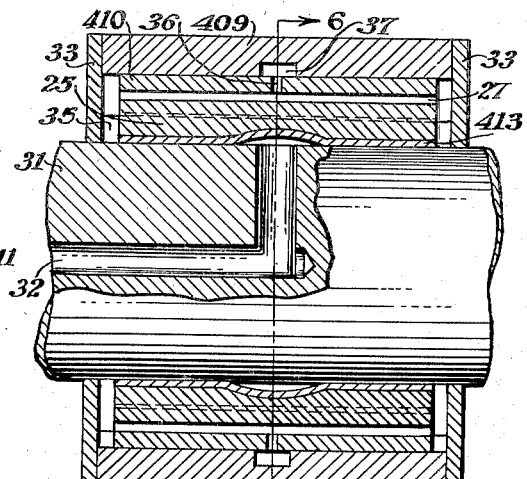
Fig. 5 is a longitudinal view, partly in section, showing another form of bearing mounted on a crank pin.
Figure 7:
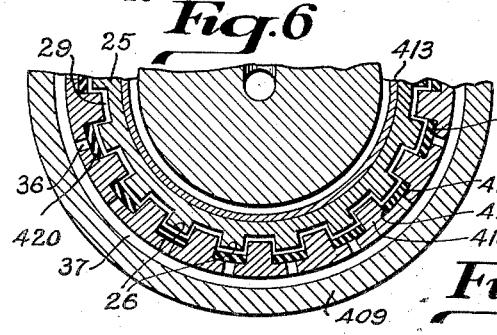
Fig. 7 is a cross-sectional view of a modification using an oil and heat resistant organic elastomer.

In Figs. 5 and 6, I have shown another form of bearing in accordance with my invention. In this embodiment I form grooves 411 in the back 410 which may be of steel, cast iron, or other suitable metal, or, in a modification, the back 410 and the bearing support 409 may be the same, the grooves 411 being milled or broached in the latter. A sleeve 25, which is preferably of a strong metal having good heat conducting properties such as, for example, beryllium copper, or it may be of brass, bronze or steel, is mounted within the cylinder 410. The sleeve should be relatively thin, and in the present embodiment it is approximately .050 inch. Ridges 26 are formed on the outer surface of the sleeve and these ridges fit loosely into the channels 411 in the back 410. The channels 411 may be, for example, .050 inch deep and .050 inch wide. The ridges 26 project from the sleeve into the channels .030 inch, for example, so that, in the embodiment shown, passages 27 will be formed by the walls of channels 411 and the surfaces of ridges 26, which passages will have a depth of approximately .020 inch and a width of .050 inch. The ridges cooperating with the walls of the channels prevent rotation of the sleeve. Obviously, the dimensions given may vary at the will of the designer, and in relatively large bearings with thick walls, the channels and corresponding ridges may be of considerably larger dimensions. The fit between the sleeve 25 and the back 410 is preferably relatively loose, having a clearance of about .002–.005 inch so as to allow an oil film to become established at 29 between the back and sleeve, which provides a certain amount of give or yield to the sleeve as the rotating load is imposed. On the inner surface of the sleeve 25, I provide a layer 413 of any suitable type of bearing metal which forms the bearing surface proper. Also, oil passages 36 are formed in the back 410 interconnecting the passages 27 with an oil conduit 37 in the support 409, or other suitable means for removing the oil.

Referring now to Fig. 5, oil under pressure is caused to flow through the passages 27. This oil may, for example, be supplied through a duct 32 in the crank pin 31, and it flows between the bearing surface 413 and crank pin and out at both ends of the bearing. It is then diverted by the cheeks 33 or other suitable type of oil seal through slots 35 in the ends of the sleeve 25, thence it flows inwardly through the passages 27, through ducts 36 and 37 in the steel back and support 409, respectively, whence the oil may be returned and recirculated back to the crank pin, through a cooling means if desired.

By forcefully circulating oil through the passages 27, which are separated from the heat generating bearing surface only by a thin layer of metal, particularly metal having good heat conducting properties, I greatly increase the cooling efficiency of the oil in removing heat from the bearing. At the same time, by providing the oil film at 29, I impart to the bearing a certain amount of elastic give which is highly beneficial and this oil film is kept intact by the oil which is flowing under pressure in the passages 27.

I may, if desired, enhance the elastic effect by inserting between the sleeve 25 and steel back 410, a suitable elastic material 420, such as, for example, an oil and heat resistant organic elastomer.

It is to be understood that other forms of embodiments of the invention may be adopted, all falling within the scope of the claims which follow:

I claim:

1. A sleeve bearing including, a cylindrical member having longitudinally extending channels in the inner face thereof; a sleeve fitting relatively loosely in the cylindrical member, said sleeve having longitudinally extending ridges which extend into the channels and cooperate with the walls of the channels for forming oil passages; means for directing oil into an end of said passages; and means for removing oil from the passages.

2. A sleeve bearing including two cylindrical members, one member being disposed concentrically within the other, one of said members having longitudinally extending channels formed in the wall thereof confronting the other member and the other of said members having longitudinally disposed ribs formed thereon and adapted to extend into said confronting channels, a surface of each of said ribs being spaced from a wall of the respective channels for forming oil passages between the ribs and channel walls, the diameter of the ribbed cylindrical member at its surfaces intermediate the ribs and the diameter of the channelled cylindrical member at its surfaces intermediate the channels being such as to accommodate a film of oil between the members at said surfaces.

3. A sleeve bearing including a cylindrical member having longitudinally extending channels in the inner face thereof, a cylindrical member disposed within the first mentioned cylindrical member and having longitudinally disposed ribs adapted to extend into said channels for preventing relative rotation between the members, the top surfaces of the ribs being spaced from the bottom walls of the channels for forming oil passages between the ribs and walls of the channels, the outside diameter of the inner cylindrical member at the points between said ribs being less than the inside diameter of the outer cylindrical member at the points between said channels whereby a film of oil may be accommodated between the surfaces of said members at said points for forming a resilient motion between the members.

4. A bearing as defined in claim 2 in which the channels are open at the ends thereof for the passage of oil therethrough.

5. A bearing as defined in claim 2 in which the channels have an opening intermediate the ends thereof and having open ends for the passage of oil through the channels.

6. A bearing as defined in claim 2, but further characterized by the ribs being spaced from the channel walls so that oil may be fed from the channels to between said surfaces.

7. A sleeve bearing including two cylindrical members, one member being disposed concentrically within the other, the confronting walls of said members being spaced from one another; and means forming a cushion between said walls, one of said members having longitudinally extending channels formed in the wall thereof confronting the other member and the other of said members having longitudinally disposed ribs thereon adapted to extend into said channels, respectively, a surface of each of said ribs being spaced from a wall of the respective channels for forming oil passages between each of the ribs and the respective channel walls through which oil may be passed.

8. A sleeve bearing including two cylindrical members, one member being disposed concentrically within the other, the confronting walls of said members being spaced from one another; and an oil resistant elastomer forming a cushion between said members, one of said members having longitudinally extending channels formed in the wall thereof confronting the other member and the other of said members having longitudinally disposed ribs thereon adapted to extend into said channels, respectively, a surface of each of said ribs being spaced from a wall of the respective channels for forming oil passages between each of the ribs and the respective channel walls through which oil may be passed.

9. A sleeve bearing comprising two concentric cylindrical members, one member providing a cylindrical bearing surface and the other member adapted to form a backing for said one member, the clearance between the confronting surfaces of said members being such as to accommodate a film of oil; interfitting means between said members for limiting rotation of one member relative to the other; and oil supply conduits for maintaining a film of oil between said members.

10. A sleeve bearing comprising two concentric cylindrical members, one member providing a cylindrical bearing surface and the other member adapted to form a backing for said one member, the confronting surfaces of said members being formed to provide lands at spaced intervals about said surfaces by which said one member is supported by said other member, the space between the confronting surfaces of said lands being such as to accommodate and retain a film of oil; and the confronting surfaces of said members between said lands being spaced apart for forming passages for the flow of oil therebetween.

11. A sleeve bearing comprising two concentric cylindrical members, the confronting surfaces of said members having longitudinally extending channels and ribs, respectively, the ribs being adapted to extend into the channels and prevent substantial rotation of one sleeve relative to the other, the clearance beween the confronting surfaces of said members between the channels and ribs, respectively, being sufficient to accommodate and retain a film of oil for cushioning means, and the confronting surfaces of said ribs and channels forming conduits for the passage of oil therethrough.

ROBERT D. PIKE.

REFERENCES CITED

The following references are of record in the file of this patent:

UNITED STATES PATENTS

| Number | Name | Date |
|---|---|---|
| 421,089 | Wood | Feb. 11, 1890 |
| 513,367 | Parsons | Jan. 23, 1894 |
| 731,978 | Tobin | June 23, 1903 |
| 1,108,761 | Kieser | Aug. 25, 1914 |
| 1,384,173 | Wikander | July 12, 1921 |
| 1,473,827 | Mills | Nov. 13, 1923 |
| 1,483,903 | Masury | Feb. 19, 1924 |
| 1,804,693 | Jones | May 12, 1931 |
| 1,957,111 | Short | May 1, 1934 |
| 2,086,841 | Bagley | July 13, 1937 |
| 2,305,439 | Miller | Dec. 15, 1942 |
| 2,316,119 | Bagley | Apr. 6, 1943 |

FOREIGN PATENTS

| Number | Country | Date |
|---|---|---|
| 226,433 | Great Britain | Dec. 24, 1924 |